United States Patent [19]

Tomita et al.

[11] 4,436,538
[45] Mar. 13, 1984

[54] FILTER FOR CLEANING EXHAUST GASES FROM DIESEL ENGINE

[75] Inventors: Masahiro Tomita; Shigeru Takagi, both of Anjo, Japan

[73] Assignee: Nippon Soken, Inc., Nishio, Japan

[21] Appl. No.: 370,348

[22] Filed: Apr. 21, 1982

[30] Foreign Application Priority Data

| Apr. 22, 1981 | [JP] | Japan | 56-61824 |
| Apr. 24, 1981 | [JP] | Japan | 56-62787 |
| Apr. 28, 1981 | [JP] | Japan | 56-64432 |

[51] Int. Cl.³ .................................................. B01D 39/20
[52] U.S. Cl. .................................... 55/482; 55/489; 55/523; 55/DIG. 5; 55/DIG. 30; 422/179; 60/311; 428/310.5; 428/116
[58] Field of Search .......... 55/523, DIG. 5, DIG. 30, 55/482, 483, 485, 529, 489; 210/510; 422/179, 180; 428/116–118, 310.5; 501/112, 119; 165/8; 60/295, 299, 311; 29/163.5 F; 252/477 R

[56] References Cited

U.S. PATENT DOCUMENTS

| 3,189,418 | 6/1965 | Gary | 60/300 |
| 3,262,578 | 7/1966 | Dennis | 210/509 |
| 3,771,967 | 11/1973 | Nowak | 422/179 |
| 3,860,403 | 1/1975 | Aoi | 55/485 |
| 3,939,902 | 2/1976 | Coobrough | 165/8 |
| 4,186,100 | 1/1980 | Mott | 210/510 |
| 4,363,644 | 12/1982 | Sato et al. | 55/523 |
| 4,364,761 | 12/1982 | Berg et al. | 55/523 |

FOREIGN PATENT DOCUMENTS

| 1924836 | 1/1970 | Fed. Rep. of Germany | 210/510 |
| 2536276 | 2/1977 | Fed. Rep. of Germany | 210/510 |
| 55-142513 | 11/1980 | Japan | 55/523 |

*Primary Examiner*—David L. Lacey
*Attorney, Agent, or Firm*—Cushman, Darby & Cushman

[57] ABSTRACT

A filter for cleaning exhaust gases emitted from a diesel engine is disclosed. The filter is composed of a cleaning portion formed of porous ceramic, through which the exhaust gases flow and in which carbon particulates in the exhaust gases are collected, and an outer wall portion formed of the same kind of material as that of the cleaning portion, which is formed around the cleaning portion so as to be integral therewith. The bulk density of the outer wall portion increases from the inner periphery thereof toward the outer periphery thereof so that the exhaust gases can be prevented from flowing out of the outer wall portion.

7 Claims, 7 Drawing Figures

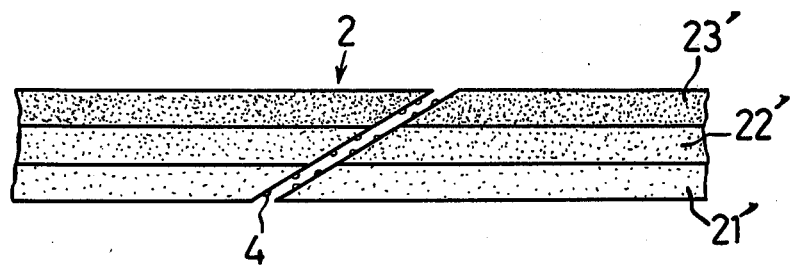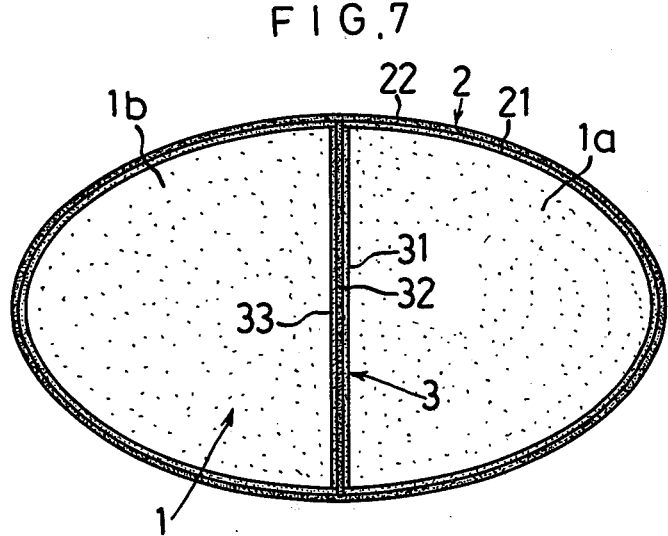

FILTER FOR CLEANING EXHAUST GASES FROM DIESEL ENGINE

BACKGROUND OF THE INVENTION

The present invention relates to a filter for collecting combustible particulates containing carbon particulates as a main ingredient (hereinafter will be called "carbon particulates") in exhaust gases emitted from an internal combustion engine such as a diesel engine.

Conventionally, a ceramic honeycomb structure coated with γ alumina or the like and carrying oxidizing catalyst has been used as the filter described above.

However, when the filter formed of the ceramic honeycomb structure is disposed in an exhaust passage of a diesel engine which emits a large amount of carbon particulates, a substantial amount of the exhaust gases passes through open passages of the honeycomb structure which extend in the same direction as the direction of flow of the exhaust gases. As a result, carbon particulates collecting efficiency of the filter become low.

In order to overcome the defect of the above described filter, a ceramic porous body provided with interconnected pores having large contact area with the exhaust gases has been proposed as the filter having excellent carbon particulates collecting efficiency.

However, this ceramic porous body is very brittle due to compression, vibrations or the like. And since the ceramic porous body has interconnected pores opening into the whole outer peripheral surface thereof, these interconnected pores must be closed so as to prevent the exhaust gases from leaking therefrom except for an exhaust gas inlet port and an exhaust gas outlet port.

In order to overcome the defect of the filter formed of ceramic porous body, a filter formed of ceramic porous body having uniform bulk density, provided with an outer wall of which cell density is large and uniform, and which is integrally formed with the ceramic porous body, has been proposed.

According to the filter provided with an outer wall, leakage of the exhaust gases can be prevented and mechanical strength is improved.

However, this filter still has defects to be solved. One of the defects is that mechanical strength of the border portion between the outer wall and the periphery of the porous portion is not sufficiently high. The other defect of this filter is that in the above described border portion, thermal-expansion coefficient largely changes due to sudden change of the wall thickness from the outer wall to the porous portion so that thermal shock resistance is very low.

Accordingly, one object of the present invention is to provide a filter for cleaning exhaust gases emitted from a diesel engine, which has high carbon particulates collecting efficiency and excellent durability.

Another object of the present invention is to provide a filter for cleaning exhaust gases emitted from a diesel engine, which is formed of a porous ceramic body provided with an outer wall preventing leakage of the exhaust gases and giving mechanical strength thereto.

Still another object of the present invention is to provide a filter for cleaning exhaust gases emitted from a diesel engine, which is formed of a porous ceramic body provided with an outer wall and which has improved thermal shock resistance.

A further object of the present invention is to provide a method for forming an outer wall having excellent mechanical strength and thermal shock resistance, on the outer periphery of the porous ceramic body.

DESCRIPTION OF THE DRAWINGS

Other objects and advantages of the invention will become apparent from the following description of embodiments with reference to the accompanying drawings wherein:

FIG. 5 is a partially sectional view of the sheet for forming an outer wall of the filter of the second embodiment;

FIG. 7 is a cross sectional view of a fourth embodiment of the filter according to the present invention.

SUMMARY OF THE INVENTION

The filter for cleaning exhaust gases of the present invention is composed of a cleaning portion formed of porous ceramic, through which the exhaust gases flow and in which carbon particulates in the exhaust gases are collected; and an outer wall portion formed of the same kind of material as that of the cleaning portion, which is formed around the cleaning portion so as to be integral therewith.

The bulk density of the outer wall portion increases from the inner periphery thereof toward the outer periphery thereof so that the exhaust gases can be prevented from flowing out of the outer wall portion.

The filter of the present invention can be formed by immersing an organic three dimensional network structure such as polyurethane foam, within a ceramic slurry bath, in order to adhere the slurry to the structure, drying the structure, spraying ceramic slurry to the outer surface of the structure in order to fill the pores, and firing the obtained structure to which ceramic slurry is sprayed.

In another embodiment of the present invention, around the three dimensional network structure, a plurality of sheets formed of the same material as that of the structure and having different cell density which is larger than that of the structure are wound so that said sheet having largest cell density is positioned on the outermost periphery of the structure, the whole structure is immersed in a ceramic slurry bath and the structure to which the slurry is adhered, is fired. As a result, a filter of the present invention can be produced.

DETAILED DESCRIPTION OF THE INVENTION

Hereinafter, the present invention will be explained in accordance with several embodiments with reference to the drawings.

Figure 1:
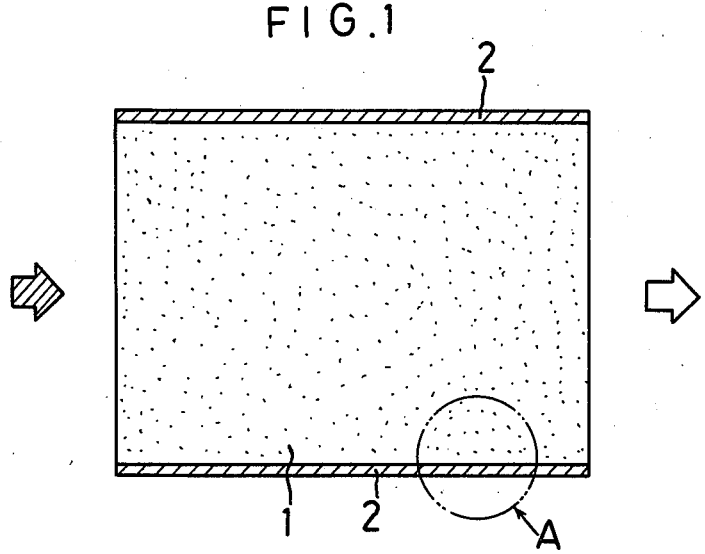
FIG. 1 is a longitudinal sectional view of an axial flow type filter of the present invention.
Figure 2:
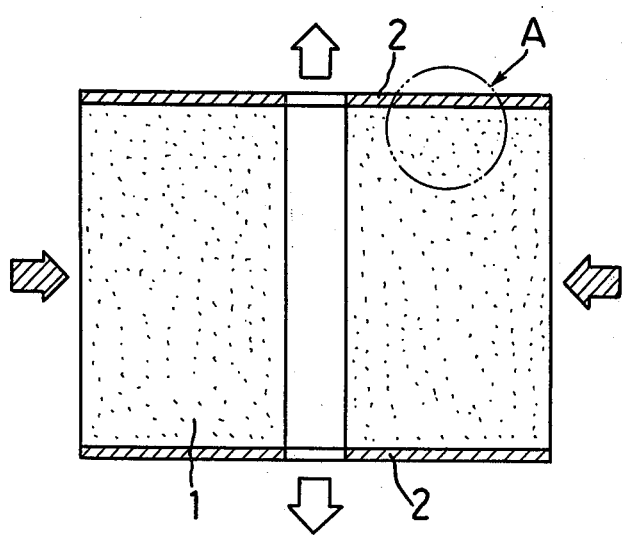
FIG. 2 is a longitudinal sectional view of a radial flow type filter of the present invention.

FIG. 1 illustrates the longitudinal section of a column-shaped axial flow type filter of the present invention, through which exhaust gases flow in the axial direction thereof and FIG. 2 illustrates the longitudinal section of a cylindrical radial flow type filter of the present invention, through which exhaust gases flow in the radial direction thereof.

In FIGS. 1 and 2, a reference numeral 1 designates a cleaning portion through which exhaust gases flow, and a reference numeral 2 designates an outer wall formed in the outer periphery of the cleaning portion 1 for reinforcing the filter.

The cleaning portion 1 is composed of porous ceramic provided with fine and inerconnected pores through which the exhaust gases flow.

The outer wall 2 is composed of porous ceramic having higher bulk density than that of the cleaning portion 1, through which the exhaust gases do not flow.

The exhaust gases emitted from a diesel engine enter the filter as shown by hatched arrows and the cleaned exhaust gases flow out of the filter as shown by white arrows.

Figure 3:
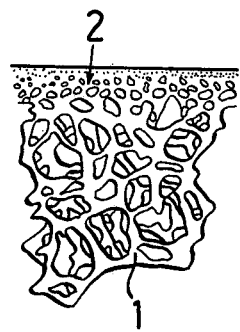
FIG. 3 is a partially sectional view of the outer peripheral portion of a first embodiment of the filter of the present invention.

FIG. 3 illustrates the section of the portion encircled by the alternate long and two short dashes line A in FIGS. 1 and 2, of a first embodiment of the filter according to the present invention.

The cleaning portion 1 and the outer wall 2 are made of ceramic material containing cordierite as a main ingredient. The bulk density of the cleaning portion is uniform while the bulk density of the outer wall continuously increases from the inner periphery to the outer periphery thereof. And the bulk density of the inner periphery of the outer wall is slightly larger than that of the outer periphery of the cleaning portion 1.

The bulk density of the outer periphery of the outer wall 2 is very high so as not to pass the exhaust gases therethrough.

The preferable range of the bulk density of the cleaning portion 1 is 0.15 to 1.2 g/cm$^3$, that of the inner periphery of the outer wall 2 is 0.5 to 1.5 g/cm$^3$ and that of the outer periphery of the outer wall 2 is 1.5 to 2.0 g/cm$^3$.

Hereinafter, the producing method of the filter of the first embodiment will be explained.

At first, polyurethane foam having three dimensional network structure, of which cell density is 6 to 20 cell/in. is cut into a columnar shape.

This polyurethane foamed body is immersed within a slurry bath which is formed by kneading cordierite fine powders finer than 200 mesh together with polyvinyl alcohol and water to make the slurry adhere to the surface of the polyurethane foamed body. For example, the slurry is composed of 1500 g of cordierite fine powder, 100 g of polyvinyl alcohol and 2000 g of water.

Next, the polyurethane foamed body is taken out of the slurry bath, and is dried at 100° C. to 200° C. for 3 hours after excess slurry is blown off. Then, to the outer peripheral surface of the polyurethane foamed body to which the slurry is adhered, the same kind of slurry is sprayed and the obtained polyurethane foamed body is dried.

These immersing, drying, spraying and drying steps are repeated until the pores of the outer peripheral portion of the three dimensional network structure are completely filled with the sprayed slurry.

At last, the whole structure is fired at 1300° to 1470° C. for 5 hours. As a result, a filter provided with an outer wall, of which bulk density continuously increases to the outermost periphery thereof, wherein pores hardly exists, can be obtained.

In place of the above method, another method can be employed. According to this method, after the immersing and drying steps as described above are repeated, the slurry is sprayed on the structure so as to fill the pores of the outer periphery thereof and the obtained structure is fired.

In the filter produced by the above described method, the exhaust gas cleaning portion is composed of porous ceramic provided with interconnected pores so that carbon particulates collecting efficiency is very high.

And the outer peripheral portion of the filter is formed into an outer wall having a high bulk density so that the mechanical strength of the filter is excellent.

Furthermore, the bulk density of the outer wall gradually changes as well as the coefficient of thermal expansion so that thermal shock resistance is excellent.

Therefore, when the filter of the first embodiment is repeatedly heated and cooled, the filter is not damaged by a sudden temperature change.

Figure 4:
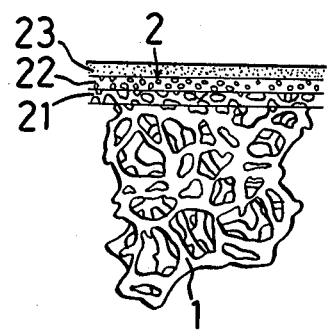
FIG. 4 is a partially sectional view of the outer peripheral portion of a second embodiment of the filter according to the present invention.

FIGS. 4 and 5 are partially sectional views of a second embodiment of a filter according to the present invention. In FIGS. 4 and 5, the outer wall 2 is composed of a first layer 21, a second layer 22 and a third layer 23. The bulk density of the outer wall 2 changes by stages. Namely, the bulk density of the first layer 21 contacting with the cleaning portion is slightly larger than that of the cleaning portion 1 and the third layer 23 has such a high bulk density that the exhaust gases do not pass therethrough. And the second layer 22 has a bulk density larger than that of the first layer 21 and smaller than that of the third layer 23.

Hereinafter, the producing method of the filter of the second embodiment will be explained.

Around a columnar polyurethane foamed body 1 having about 8 cell/in., three pieces of polyurethane sheets 21', 22', 23' having different cell density, as shown in FIG. 5, are wound in layers.

The cell density of the sheet 21' which composes an innermost layer of the outer wall 2 is slightly larger than that of the polyurethane foamed body 1 and is about 20 cell/in. while the cell density of the outermost sheet 23' is very large and is about 50 cell/in. And the intermediate sheet 22' has a cell density larger than that of the sheet 21' and smaller than that of the sheet 23' and is about 30 cell/in.

Next, the polyurethane foamed body 1 and the wound sheets 21', 22', 23' are subjected to the immersing and drying steps which are the same as those of the first embodiment and then are fired.

The obtained filter is provided with an outer wall composed of three layers 21, 22, 23 of which bulk density increases by stages as shown in FIG. 4.

The polyurethane sheets 21', 22', 23' are wound around the polyurethane foamed body 1 by closely contacting both ends of each sheet and joining them by an organic adhesive tape.

And the sheets 21', 22', 23' can be wound around the polyurethane foamed body 1 by forming both ends of each sheet into a tapered shape and joining the tapered ends by an organic adhesive agent 4 as shown in FIG. 5.

Furthermore, by applying an organic adhesive agent 4 to the surfaces of the sheets 21', 22', 23' and the outer peripheral surface of the polyurethane foamed body 1 and joining the sheets 21', 22', 23' and the polyurethane foamed body 1, the desired filter can be formed.

Figure 6:
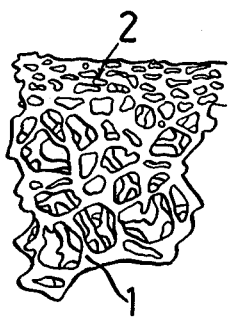
FIG. 6 is a partially sectional view of the outer peripheral portion of a third embodiment of the filter according to the present invention.

FIG. 6 illustrates the partial section of the outer peripheral portion of the filter of a third embodiment.

In the third embodiment, the bulk density of the outer wall 2 continuously changes in the same manner as that of the first embodiment.

The outer wall 2 is formed by applying pressure to the outer surface of a columnar polyurethane foamed body 1 while being heated, so that the bulk density of the outer wall 2 can be continuously increased toward the outer surface thereof.

Then, the obtained polyurethane foamed body is repeatedly subjected to the immersing step in the ceramic slurry bath and the drying step and is finally fired to form the filter of the third embodiment.

FIG. 7 illustrates a fourth embodiment of the present invention. The cleaning portion 1 is composed of at least one pair of filter elements 1a, 1b, which are separated from each other by a partition wall 3. The outer wall 2 consists of two layers 21, 22. The bulk density of the layer 21 is slightly larger than that of the cleaning portion 1 and the layer 22 has such a high bulk density that the exhaust gases do not pass therethrough.

The partition wall 3 consisting of three layers 31, 32, 33. The bulk density of each of the first layer 31 and the third layer 33 is equal to that of the first layer 21 of the outer wall 2. And the bulk density of the second layer 32 positioned between the first layer 31 and the third layer 33 is equal to that of the second layer 22.

The filter of the fourth embodiment is formed by assembling two polyurethane foamed bodies for forming the filter elements 1a, 1b and two pieces of the polyurethane sheets for forming the outer wall 2 and the partition wall 3, to form a composite body, making ceramic slurry adhere to the composite body in the same manner as that of the preceding embodiments, drying and firing the composite body to which ceramic slurry adheres.

The three dimensional network structure to which the ceramic slurry adheres can be formed of urea foam or vinyl chloride foam other than polyurethane foam. In addition, organic fibers can be used as the material of the filter.

The ceramic slurry can be formed of alumina, or mullite other than cordierite.

As described above, the exhaust gas cleaning filter to be used for a diesel engine, of the present invention is composed of porous ceramic so that carbon particulates collecting efficiency is very excellent.

And since the filter of the present invention is provided with an outer wall of which bulk density increases toward the outer periphery thereof continuously or by stages, thermal shock resistance can be maintained excellent and mechanical strength of the filter can be improved.

Having now fully described the invention, it will be apparent to one of ordinary skill in the art that many changes and modifications can be made thereto without departing from the spirit or scope of the invention as set forth herein.

What is claimed is:

1. A filter for collecting carbon particulates in the exhaust gases emitted from a diesel engine, comprising:

an exhaust gas cleaning portion provided with a large number of interconnected fine pores through which exhaust gases flow; said exhaust gas cleaning portion being provided with an exhaust gas inlet surface and an exhaust gas outlet surface; and an outer wall portion which is formed around the outer peripheral surface of said cleaning portion so as to be integral therewith, except for said exhaust gas inlet surface and said exhaust gas outlet surface of said cleaning portion;

said exhaust gas cleaning portion being formed of porous ceramic, the whole of which has uniform bulk density;

said outer wall portion being formed of porous ceramic, the bulk density of said outer wall portion increasing from the inner periphery thereof toward the outer periphery thereof so that the inner periphery of said outer wall portion has a bulk density slightly larger than that of the outer periphery of said cleaning portion while the outer periphery of said outer wall portion has such a high bulk density that the exhaust gases do not flow therethrough.

2. A filter according to claim 1, wherein:
the bulk density of said outer wall portion continually increases from the inner periphery to the outer periphery thereof.

3. A filter according to claim 1, wherein:
the bulk density of said outer wall portion increases in stages from the inner periphery to the outer periphery thereof.

4. A filter according to claim 1, wherein:
the bulk density of said porous ceramic comprising said exhaust gas cleaning portion is 0.15 to 1.2 g/cm$^3$.

5. A filter according to claim 1, wherein:
the bulk density of said inner periphery of said outer wall portion, contacting with the outer peripheral surface of said cleaning portion is 0.5 to 1.5 g/cm$^3$; and the bulk density of said outer periphery of said outer wall portion is 1.5 to 2.0 g/cm$^3$.

6. A filter according to claim 1, wherein:
said ceramic is selected from the group consisting of cordierite, alumina and mullite.

7. A filter according to claim 1, wherein:
said exhaust gas cleaning portion comprises two cleaning elements which extend in the axial direction of said filter and are disposed so that the axially extending surfaces thereof are opposed to each other;

further comprising:

a partition wall which is interposed between said opposed axially extending surfaces of said two cleaning elements;

the opposed axially extending ends of said partition wall being fixed to said outer wall portion; and said partition wall having a cell density which increases from both surfaces toward the center thereof in the width direction thereof.

* * * * *